US012096524B2

(12) United States Patent
Zhao et al.

(10) Patent No.: US 12,096,524 B2
(45) **Date of Patent: *Sep. 17, 2024**

(54) ATOMIZING CORE AND ATOMIZING APPARATUS

(71) Applicant: SHENZHEN FIRST UNION TECHNOLOGY CO., LTD., Shenzhen (CN)

(72) Inventors: Xiaoqiang Zhao, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 92 days.

This patent is subject to a terminal disclaimer.

(21) Appl. No.: 17/955,659

(22) Filed: Sep. 29, 2022

(65) Prior Publication Data

US 2023/0044976 A1 Feb. 9, 2023

Related U.S. Application Data

(63) Continuation of application No. 16/546,698, filed on Aug. 21, 2019, now Pat. No. 11,490,463.

(30) Foreign Application Priority Data

Jan. 5, 2019 (CN) ......................... 201920016364.7

(51) Int. Cl.

*H05B 3/44* (2006.01)
*H05B 3/06* (2006.01)

(52) U.S. Cl.

CPC ................. *H05B 3/44* (2013.01); *H05B 3/06* (2013.01); *H05B 2203/021* (2013.01)

(58) Field of Classification Search

CPC ...... H05B 3/44; H05B 3/06; H05B 2203/021; H05B 3/34; A24F 40/46; A24F 40/44; A24F 40/10; A24F 40/485

See application file for complete search history.

(56) References Cited

U.S. PATENT DOCUMENTS 11,490,463 B2 * 11/2022 Zhao ........................ A24F 40/44
2016/0015081 A1 1/2016 Liu (Continued)

FOREIGN PATENT DOCUMENTS

CN 204653781 U 9/2015
CN 205831075 U 12/2016

(Continued)

*Primary Examiner* — Jean F Duverne

(74) *Attorney, Agent, or Firm* — IPRO, PLLC

(57) ABSTRACT

An atomizing core includes a liquid guiding element and a heating element. The liquid guiding element includes a first liquid guiding unit and a second liquid guiding unit. The second liquid guiding unit includes a first surface and a second surface that are opposed to one another. The first surface is in contact with the first liquid guiding unit. The second liquid guiding unit is provided with one or more liquid storage chambers extended through the first surface and the second surface. The heating element is in contact with the first liquid guiding unit, configured to heat an atomizing liquid conveyed from the first liquid guiding unit to generate an aerosol for inhaling.

20 Claims, 6 Drawing Sheets

(56) References Cited

U.S. PATENT DOCUMENTS

| | | | |
|---|---|---|---|
| 2016/0015082 A1 | 1/2016 | Liu | |
| 2016/0353802 A1 | 12/2016 | Malgat et al. | |
| 2017/0251729 A1 | 9/2017 | Li et al. | |
| 2018/0007964 A1* | 1/2018 | Zhu | A61M 15/06 |

FOREIGN PATENT DOCUMENTS

| | | | | |
|---|---|---|---|---|
| EP | 3363309 A2 * | 8/2018 | | A24F 40/42 |
| WO | 2018001109 A1 | 1/2018 | | |
| WO | 2018170849 A1 | 9/2018 | | |

* cited by examiner

ATOMIZING CORE AND ATOMIZING APPARATUS

TECHNICAL FIELD

Embodiments of the present application relate to the technical field of smoking articles, and in particular, relate to an atomizing core and an electronic cigarette including the atomizing core.

BACKGROUND

An electronic cigarette is an electronic product that simulates the experience of smoking a tobacco cigarette, and has the same appearance, smoke and taste of the cigarette. The electronic cigarette works by heating an atomizing liquid containing nicotine or the like which generates an aerosol or vapor that is inhaled by a user. Since the electronic cigarette is easily carried, causes no open fire and is environmentally friendly, the electronic cigarette is well populated by smokers.

The electronic cigarette generally includes an atomizing assembly and a battery assembly. The atomizing assembly includes an atomizing core. The atomizing core generally includes a liquid guiding element and a heating element. The liquid guiding element conveys an atomizing liquid in a liquid storage tiny chamber in the atomizing assembly to the heating element. The heating element is powered on and generate heat to heat the atomizing liquid and thus generate an aerosol that is directly inhale by a user. The power assembly is used to supply power for the atomizing assembly.

During practice of embodiments of the present application, the inventors have found that the conventional liquid guiding element has a low liquid guiding speed; when the heating element constantly works, a small amount of smoke is generated in one aspect, and in another aspect, no sufficient atomizing liquid is conveyed to the heating element to take away the heat on the heating element. As such, temperature lowering for the heating element is not sufficient. Consequently, the heating element works at a very high temperature and thus causing a small of burning, and user experience is severely degraded.

SUMMARY

An embodiment of the present application provides an atomizing core. The atomizing core includes: a liquid guiding element and a heating element; wherein the liquid guiding element includes a first liquid guiding unit and a second liquid guiding unit that are superimposed one upon another, the second liquid guiding unit including a first surface and a second surface that are opposed to one another, the first surface being in contact with the first liquid guiding unit, the second liquid guiding unit being provided with one or more liquid storage chambers extended through the first surface and the second surface; and the heating element is in contact with the first liquid guiding unit, configured to heat an atomizing liquid conveyed from the first liquid guiding unit to the heating element to generate aerosol for a user to directly draw in.

Another embodiment of the present application provides an atomizing core. The atomizing core includes: a liquid guiding element and a heating element; wherein the liquid guiding element includes a second liquid guiding unit, the second liquid guiding unit including a first surface and a second surface that are opposed to one another, the second liquid guiding unit including a mesh portion and a liquid locking portion located on both ends of the mesh portion, the mesh portion being provided with one or more liquid storage chambers extended through the first surface and the second surface; and the heating element is configured to heat an atomizing liquid to generate an aerosol for a user to directly inhale.

Still another embodiment of the present application provides an atomizing core. The atomizing core includes: a liquid guiding element and a heating element; wherein the liquid guiding element includes a liquid absorption layer, a liquid storage layer and an atomization layer that are stacked in sequence, the liquid absorption layer, the liquid storage layer and the atomization layer being an integrally body, the liquid storage layer being provided with a plurality of liquid storage chambers, the liquid storage layer being disposed between the atomization layer and the liquid absorption layer, the liquid storage layer including a first surface in contact with the liquid absorption layer and a second surface in contact with the atomization layer, the liquid storage tiny chamber extended through the first surface and the second surface; and the heating element is in contact with the atomization layer, configured to heat an atomizing liquid conveyed from the first liquid guiding unit to the heating element to generate an aerosol for a user to directly inhale.

Still another embodiment of the present application provides an electronic cigarette. The electronic cigarette includes the atomizing cores according to the embodiment of the application.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

REFERENCE NUMERALS AND DENOTATIONS THEREOF

Figure 1:
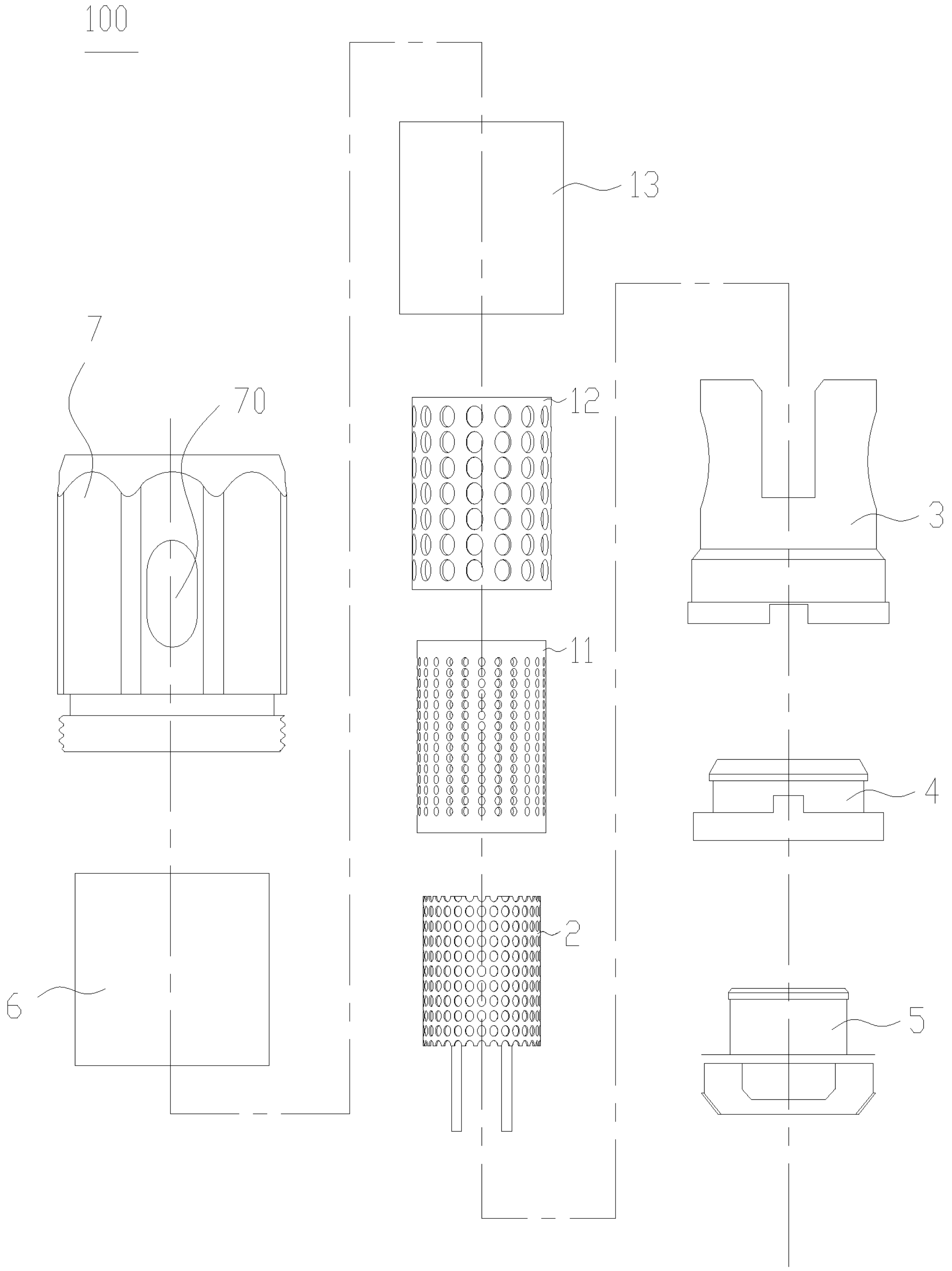
FIG. 1 is an exploded view of an atomizing core according to a first embodiment of the present application.

| | | | |
|---|---|---|---|
| Atomizing core 100 | Liquid guiding element 1 | First liquid guiding unit 11 | Liquid guiding micropore 110 |
| Second liquid guiding unit 12, 14 | First surface 121, 143 | Second surface 122, 144 | Liquid locking portion 141 |
| Mesh portion 142 | Liquid storage tiny chamber 120, 1420 | Third liquid guiding unit 13 | Heating element 2 |
| Heat generating part 21 | Mesh 210 | First pin 22 | Second pin 23 |
| Bracket 3 | First body 31 | Groove 310 | First cylinder 32 |
| Slot 321 | Liquid passing hole 322 | Spacer 4 | Second body 41 |
| Bump 411 | Second cylinder 42 | Electrode part 5 | Third body 51 |
| Third cylinder 52 | Holding part 53 | Liquid barrier 6 | Cover body 7 |
| Liquid guiding hole 70 | | | |

DETAILED DESCRIPTION

For better understanding of the present application, the present application is described in detail with reference to attached drawings and specific embodiments. It should be noted that, when an element is defined as "being secured or fixed to" another element, the element may be directly positioned on the element or one or more centered elements may be present therebetween. When an element is defined as "being connected or coupled to" another element, the element may be directly connected or coupled to the element or one or more centered elements may be present therebetween. As used herein, the terms "upper", "lower", "left", "right", "inner", "outer", "internal", "external" and the like expressions are used for illustration purposes only.

Unless the context clearly requires otherwise, throughout the specification and the claims, technical and scientific terms used herein denote the meaning as commonly understood by a person skilled in the art. Additionally, the terms used in the specification of the present application are merely for description the embodiments of the present application, but are not intended to limit the present application. As used herein, the term "and/or" in reference to a list of two or more items covers all of the following interpretations of the term: any of the items in the list, all of the items in the list and any combination of the items in the list.

An atomizing liquid according to the present application may be a tobacco tar, a liquid pharmaceutical ingredient or other aromatic substances that are volatile when being heated.

An electronic cigarette according to the present application mainly includes an atomizing sleeve (not illustrated in the drawings), an atomizing core 100, a control assembly (not illustrated in the drawings) and a battery assembly (not illustrated in the drawings). The atomizing sleeve stores an atomizing liquid. The atomizing core 100 is received in the atomizing sleeve, and configured to vaporize an atomizing liquid stored by the atomizing sleeve, such that an aerosol is generated. The battery assembly is configured to supply power for the atomizing core 100. The control assembly is configured to control start or stop of the atomizing core 100.

First Embodiment

Figure 2:
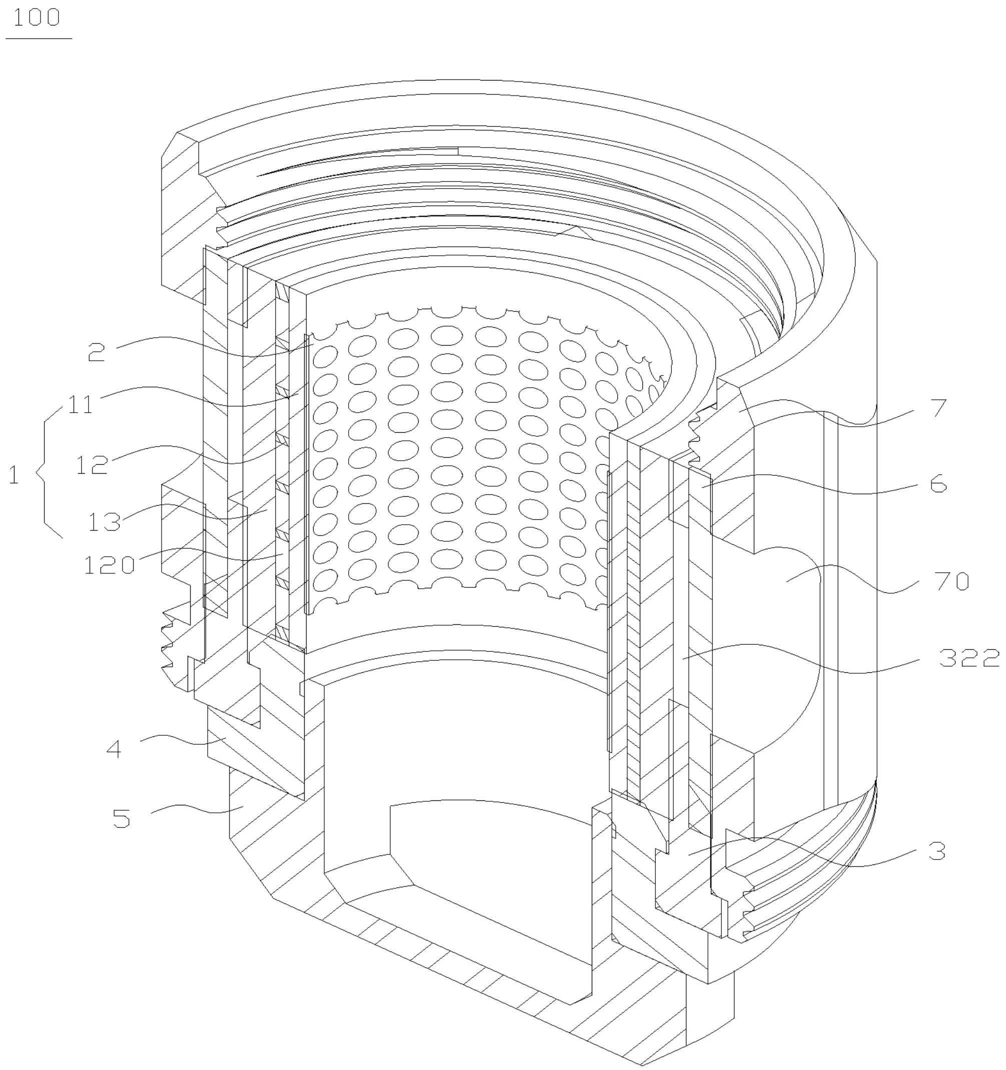
FIG. 2 is a isometric cross-sectional view of the atomizing core according to the first embodiment of the present application.

As illustrated in FIG. 1 and FIG. 2, the first embodiment of the present application provides an atomizing core 100. The atomizing core 100 includes a liquid guiding element 1, a heating element 2, a bracket 3, a spacer 4, an electrode part 5, a liquid barrier 6 and a cover body 7.

The liquid guiding element 1 includes a first liquid guiding unit 11, a second liquid guiding unit 12 and a third liquid guiding unit 13 that are sequentially superimposed one upon another. In this embodiment, the first liquid guiding unit 11, the second liquid guiding unit 12 and the third liquid guiding unit 13 are all tubular in shape, the second liquid guiding unit 12 is sleeved outside the first liquid guiding unit 11, and the third liquid guiding unit 13 is sleeved outside the second liquid guiding unit 12. The first liquid guiding unit 11, the second liquid guiding unit 12 and the third liquid guiding unit 13 may be fabricated from at least one of aramid fiber, common fiber, natural cotton, organic cotton and non-woven fabric. That is, the first liquid guiding unit 11, the second liquid guiding unit 12 and the third liquid guiding unit 13 may be fabricated from one material or fabricated from a composite material thereof. In this embodiment, the organic cotton is selected as the material for fabricating the liquid guiding element 1.

It may be understood that the first liquid guiding unit 11, the second liquid guiding unit 12 and the third liquid guiding unit 13 may also be fabricated by blending spinning.

It may be understood that, in alternative embodiments, the first liquid guiding unit 11 and the third liquid guiding unit 13 are respectively fabricated from at least one of aramid fiber, common fiber, natural cotton, organic cotton and non-woven fabric; and the second liquid guiding unit 12 is fabricated from at least one of porous materials having a micropore capillarity effect, such as, porous ceramics, foaming metals, porous glass, hard glass fiber tubes and the like.

Figure 3:
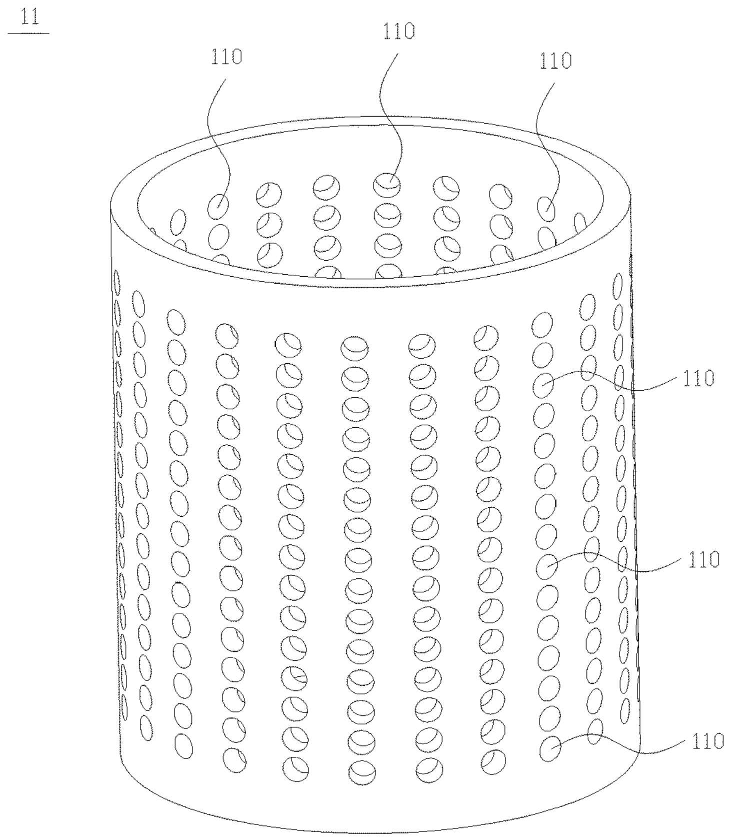
FIG. 3 is a isometric view of a first liquid guiding unit of the atomizing core according to the first embodiment of the present application.

As illustrated in FIG. 1 to FIG. 3, the first liquid guiding unit 11 is provided with a plurality of liquid guiding micropores 110. The plurality of liquid guiding micropores 110 are evenly spaced apart from each other along an axial line of the second liquid guiding unit 11 and also evenly spaced apart from each other along an axial direction of the first liquid guiding unit 11. The liquid guiding micropore has a pore size of being less than 0.8 mm, for example, 0.1 mm, 0.2 mm, 0.3 mm, 0.4 mm, 0.5 mm, 0.6 mm, 0.7 mm, 0.8 mm, or the like.

In the related art, the material of the first liquid guiding unit 11 in contact with the heating element 2 is originally provided with nano-scale pores having a size of from 8 μm to 20 μm, and under a permeation effect of the nano-scale pores on the first liquid guiding unit 11, an atomizing liquid is permeated from one side of the first liquid guiding unit 11 to the heating element 2 on the other side, such that the atomizing liquid is vaporized.

In this embodiment, the first liquid guiding unit 11 in contact with the heating element 2 is provided with millimeter-scale liquid guiding micropores 110, such that the first liquid guiding unit 11 conveys the atomizing liquid to the heating element 2 at a higher speed. After multiple experiments by the inventors of the present application, it is measured that when liquid micropore 110 having a pore size of being less than 0.8 mm are arranged on the first liquid guiding unit 11, the liquid guiding speed of the first liquid guiding unit 11 according to the embodiment of the present application is improved by 20% to 30% relative to the scenario where no liquid micropore 110 is arranged on the first liquid guiding unit 11. Therefore, the liquid guiding speed of the first liquid guiding unit 11 is greatly improved.

Figure 4:
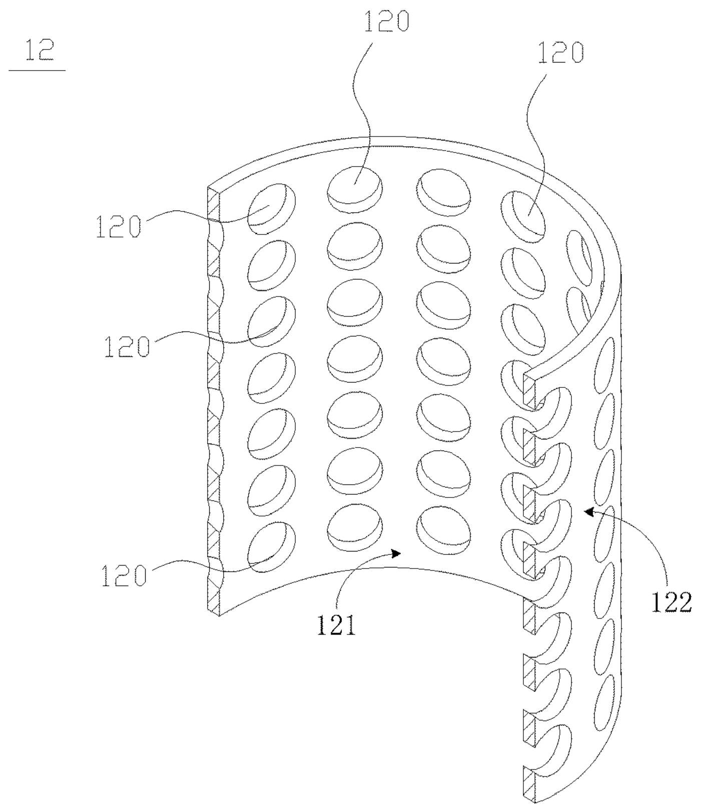
FIG. 4 is a isometric cross-sectional view of a second liquid guiding unit of the atomizing core according to the first embodiment of the present application.

As illustrated in FIG. 1, FIG. 2 and FIG. 4, the second liquid guiding unit 12 includes a first surface 121 and a second surface 122 that are opposed to one another. The first surface 121 is in contact with the first liquid guiding unit 11, and the second surface 122 is in contact with the third liquid guiding unit 13. The second liquid guiding unit 12 is provided with a plurality of liquid storage chambers 120. Each liquid storage tiny chamber 120 extended through the first surface 121 and the second surface 122. That is, each liquid storage chamber 120 is a through hole penetrating two opposing sides of the second liquid guiding unit 12. In this embodiment, the through hole has a diameter of from 0.8 mm to 10 mm. The diameter of the through hole may be adjusted according to the actual needs, which may be, for example, 0.8 mm, 0.9 mm, 1.1 mm, 1.2 mm, 1.5 mm, 2 mm, 3 mm, 4 mm or the like. The plurality of liquid storage chambers 120 are evenly spaced apart from each other along a circumferential direction of the second liquid guiding unit 12, and the plurality of liquid storage chambers 120 are also evenly spaced apart from each other along an axial direction of the second liquid guiding unit 12.

A plurality of liquid storage chambers 120 are arranged on the second liquid guiding unit 12. Each liquid storage tiny chamber 120 may store the atomizing liquid. This greatly increases a liquid storage capacity of the second liquid guiding unit 12, and thus improves a liquid storage capacity of the liquid guiding element 1. The first liquid guiding unit 11 and the third liquid guiding unit 13 are respectively disposed on two opposing sides of the second liquid guiding unit 12, such that a better liquid retentive effect is achieved for the atomizing liquid stored in the liquid storage chambers 120 on the second liquid guiding unit 12.

After multiple experiments by the inventors of the present application, it is measured that when the second liquid guiding unit 12 is not provided with the liquid storage chambers 120, a liquid storage rate of the second liquid guiding unit 12 is between 0.3 and 0.6 and the liquid storage rate of the second liquid guiding unit 12 may reach 0.7 to 0.95 when the liquid storage chambers 120 are arranged. The liquid storage capacity of the second liquid guiding unit 12 is greatly increased and the liquid storage capacity of the liquid guiding element is also improved.

It may be understood that, in alternative embodiments, the first liquid guiding unit 11, the second liquid guiding unit 12 and the third liquid guiding unit 13 may also be superimposed one upon another in a flat plate shape.

It may be further understood that, in alternative embodiments, the first liquid guiding unit 11, the second liquid guiding unit 12 and the third liquid guiding unit 13 may also be an integrated body. Accordingly, the liquid guiding element 1 may be alternative described to have three layers, that is, a liquid storage layer disposed inbetween and including the liquid storage chambers 120, a liquid absorption layer disposed on one side of the liquid storage layer, and an atomizing layer disposed on the other opposing side of the liquid storage layer. In this embodiment, the liquid absorption layer corresponds to the third liquid guiding unit 13, the liquid storage layer corresponds to the second liquid guiding unit 12, and the atomizing layer corresponds to the first liquid guiding unit 11. In this embodiment, the liquid guiding element 1 may be fabricated from at least one of porous materials having a micropore capillarity effect, such as, porous ceramics, foaming metals, porous glass, hard glass fiber tubes and the like.

Figure 5:
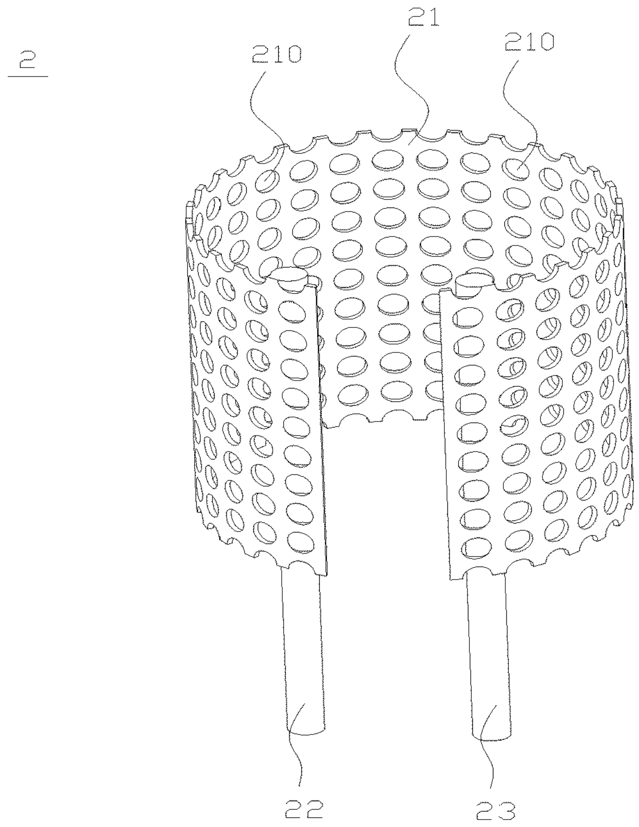
FIG. 5 is a isometric view of a heating element of the atomizing core according to the first embodiment of the present application.

As illustrated in FIG. 1, FIG. 2 and FIG. 5, the heating element 2 is received in the first liquid guiding unit 11 and is attached to an inner surface of the first liquid guiding unit 11. The heating element 2 includes a heat generating part 21, a first pin 22 and a second pin 23. The first pin 22 and the second pin 23 are respectively disposed at two end portions of the heat generating part 21. The heat generating part 21 is a heat generating sheet that is provided with a plurality of meshes 210 and extends along an axial line of the first liquid guiding unit 11. The meshes 210 are configured to regulate a resistance of the heat generating part 21. The heat generating part 21 generates heat after being electrically conducted, and heats the atomizing liquid conveyed from the first liquid guiding unit 11 to the heat generating part 21 to generate an aerosol for a user to directly inhale. The heat generating part 21 is fabricated from a conductive metal material having a high conductivity. The materials for fabricating a heat generator include nickel, iron-chromium-aluminum alloys, nickel-chromium alloys, nickel-iron alloys, stainless steels, titanium alloys and the like. The first pin 22 and the second pin 23 are fabricated from metal materials having a good conductivity, for example, copper, a copper alloys, aluminum, aluminum alloys, gold, gold alloys, silver and silver alloys.

Figure 6:
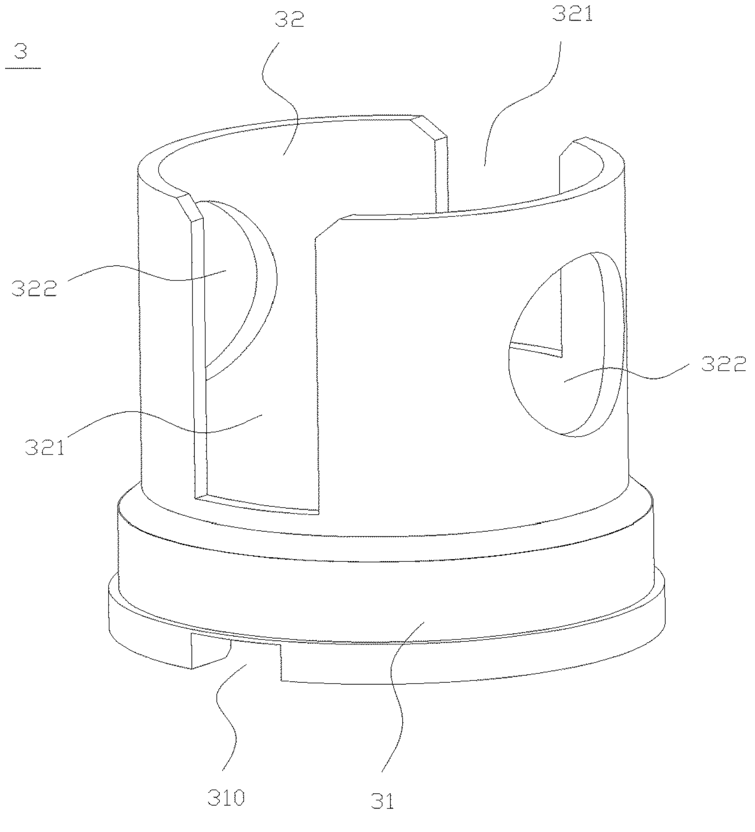
FIG. 6 is a isometric view of a bracket of the atomizing core according to the first embodiment of the present application.

As illustrated in FIG. 1, FIG. 2 and FIG. 6, the bracket 3 includes a first body 31 and a first cylinder 32. The first cylinder 32 is formed by extension upward from the first body 31. The first body 31 and the first cylinder 32 are both in a hollow cylinder-shaped structure. The first body 31 has an outer diameter that is greater than an outer diameter of the first cylinder 32. Two slots 321 are arranged downwardly from an upper end of the first cylinder 32. These two slots 321 are symmetrically arranged along a circumferential direction of the first cylinder 32, such that the first cylinder 32 is partitioned into two arc-shaped sheets. Each arc-shaped sheet is provided with a liquid passing hole 322 through two opposing sides of the arc-shaped sheet. The liquid guiding element 1 is received in the first cylinder 32. That is, an outer surface of the first liquid guiding unit 11 is attached to an inner surface of the first cylinder 32. The atomizing liquid outside the bracket 3 is passed through the liquid passing hole 322 and then enter the first liquid guiding unit 11. Two grooves 310 are upwardly arranged from a lower surface of the first body 31. It may be understood that one, three, four, five, six, or any other quantities of grooves 310 may be arranged. The first body 31 is in contact with the first pin 22.

It may be understood that other quantities of slots 321 may be arranged according to the actual needs. For example, three, four, five, six or any other quantities of slots may be arranged. Correspondingly, three, four, five, six or any other quantities of arc-shaped sheets may be formed. The bracket 3 is fabricated from conductive materials having a specific strength, for example, copper or copper alloys. In this embodiment, the bracket 3 is fabricated from brass, that is, an alloy of cooper and zinc.

Figure 7:
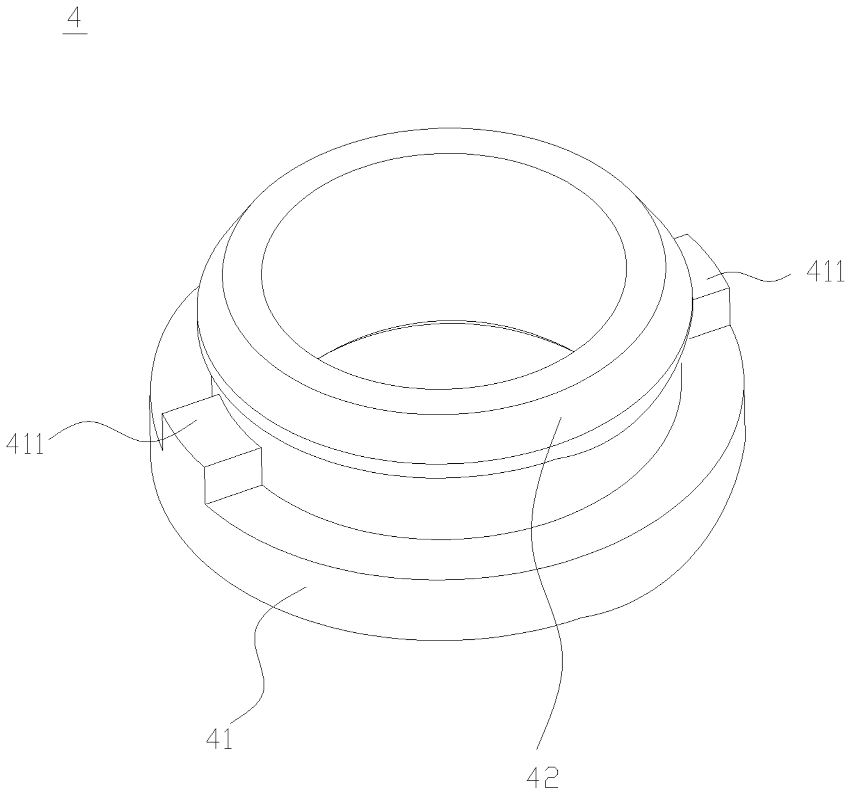
FIG. 7 is a isometric view of a spacer of the atomizing core according to the first embodiment of the present application.

As illustrated in FIG. 1, FIG. 2 and FIG. 7, the spacer 4 is in a hollow cylinder-shaped structure. The spacer 4 includes a second body 41 and a second cylinder 42. The second cylinder 42 is formed by extension upward from the second body 41. The second body 41 has an outer diameter that is greater than an outer diameter of the second cylinder 42, such that a step is defined between the second body 41 and the second cylinder 42. The second cylinder 42 is received in the first body 31. That is, an outer surface of the second cylinder 42 is attached to an inner surface of the first body 31. Two bumps 411 mating with the grooves 310 on the first body 31 protrude from the second body 41 is provided with. The bump 411 is received in the groove 310, such that circumferential positioning is practiced between the spacer 4 and the bracket 3. An upper surface of the second body 41 abuts against a lower surface of the first body 31.

The spacer 4 may be fabricated from soft and insulating materials, such as natural rubber, artificial rubber, silica gel or the like.

Figure 8:
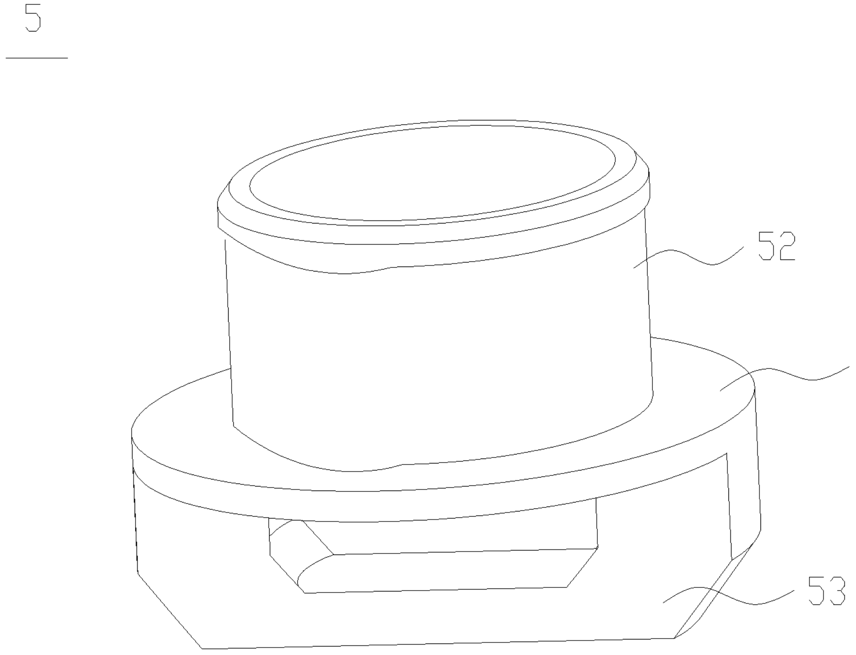
FIG. 8 is a isometric view of an electrode part of the atomizing core according to the first embodiment of the present application.

As illustrated in FIG. 1, FIG. 2 and FIG. 8, the electrode part 5 is approximately in a hollow cylinder-shaped structure. The electrode part 5 includes a third cylinder 52, a third body 51 and a holding part 53. The third cylinder 52 is formed by extension upward from the third body 51. The third cylinder 51 has an outer diameter that is greater than an outer diameter of the third body 51. The third cylinder 52 is received in the second cylinder 42. An upper end face of the third body 51 abuts against a lower end face of the second body 41. The holding part 53 is formed by extension downward from the third body 51. The holding part 53 is mainly configured to be convenience for holding the electrode part 5 by operator or clamp and embedding the electrode part 5 into the second cylinder 42.

The electrode part 5 is fabricated from conductive metal materials, for example, copper, copper alloys, aluminum, aluminum alloys, stainless steels or the like. In this embodiment, the electrode part 5 is fabricated from a stainless steel material. The first pin of the heating element 2 is disposed between the second body 41 and the third body 51. That is, the first pin 22 is held between the second body 41 and the third body 51. Therefore, the first pin 22 is in contact with the third body 51, and electrically connected to the electrode part 5. The second pin 23 is disposed between the second body 41 and the first body 31. That is, the second pin 23 is held between the second body 41 and the first body 31. Therefore, the second pin 23 is in contact with the first body 21, and electrically connected to the bracket 3.

The first pin 22 and the second pin 23 of the heating element 2 are respectively disposed on a lower side and an upper side of the second body 41 of the spacer, and thus isolated by the spacer 4 such that the two pins may not be in contact with each other. This prevents short circuit of the heating element 2 due to a contact between the first pin 22 and the second pin 23.

As illustrated in FIG. 1 and FIG. 2, the liquid barrier 4 is in a hollow cylinder-shaped structure. The liquid barrier 6 is sleeved outside the first cylinder 32. The liquid barrier 6 covers the liquid passing hole 322 and the slots 321 on the first cylinder 32. The liquid barrier 6 is fabricated from at least one of aramid fiber, common fiber, natural cotton, organic cotton and non-woven fabric. The liquid barrier 6, in one aspect, adsorbs the atomizing liquid, and in another aspect, reduces the speed of the atomizing liquid flowing towards the liquid pass hole 322 and the slot 321. In this way, the atomizing liquid is prevented from quickly flowing towards the liquid pass hole 322 and the slot 321, and thus the atomizing liquid may not leak from the liquid guiding element 1 before being atomized.

The cover 7 is sleeved outside the liquid barrier 6, and the liquid barrier is arranged between the bracket 3 and the cover 7 for isolation, such that the bracket 3 is tightly arranged in the cover 7. The cover 7 is in a hollow cylinder-shaped structure. A cylinder wall of the cover 7 is provided with four liquid guiding holes 70, and the atomizing liquid in an atomizing sleeve enters the liquid barrier 6 via the liquid guiding holes 70. The four liquid guiding holes 70 are respectively opposing the two liquid guiding holes 322 and the two slots 321. A lower end of the cover 7 is provided with outer threads, such that the atomizing core 100 is connected to the other parts of the electronic cigarette.

During assembling of the atomizing core 100, the first liquid guiding unit 11 is firstly sleeved outside the heating element 2, and then the second liquid guiding unit 12 is sleeved outside the first liquid guiding unit 11 and the third liquid guiding unit 13 is sleeved outside the second liquid guiding unit 12. Afterwards, the liquid guiding element 1 is disposed inside the first cylinder 32 of the bracket 3. The spacer 4 is then inserted into the first body 31 of the bracket 3, and meanwhile the first pin 22 is disposed between the first body 31 and the second body 41. Subsequently, the electrode part 5 is inserted into the spacer 4, and meanwhile the second pin is disposed between the second body 41 and the third body 51. The liquid barrier is then sleeved outside the first cylinder 32 of the bracket. Finally, the cover 7 is sleeved outside the liquid barrier 6 to complete the assembling process of atomizing core 100.

According to the embodiment of present application, the liquid guiding element 1 includes the first liquid guiding unit 11, the second liquid guiding unit 12 and the third liquid guiding unit 13 that are sequentially superimposed. The second liquid guiding unit 12 is provided with a plurality of liquid storage chambers 120. The second liquid guiding unit 12 is disposed between the first liquid guiding unit 11 and the third liquid guiding unit 13. Each liquid storage tiny chamber 120 may store an atomizing liquid, such that a liquid storage capacity of the second liquid guiding unit 12 is greatly increased and liquid storage capacity of the liquid guiding element 1 is improved. As the liquid storage capacity improved, a liquid guiding speed at which the liquid guiding element 1 conveys the atomizing liquid to the heating element 2 is enhanced accordingly. In this way, in one aspect, a large smoke amount is ensured, and in another aspect, the heating element 2 is prevented from a smell of burning due to over-high temperatures and good user experience is achieved.

Second Embodiment

Figure 9:
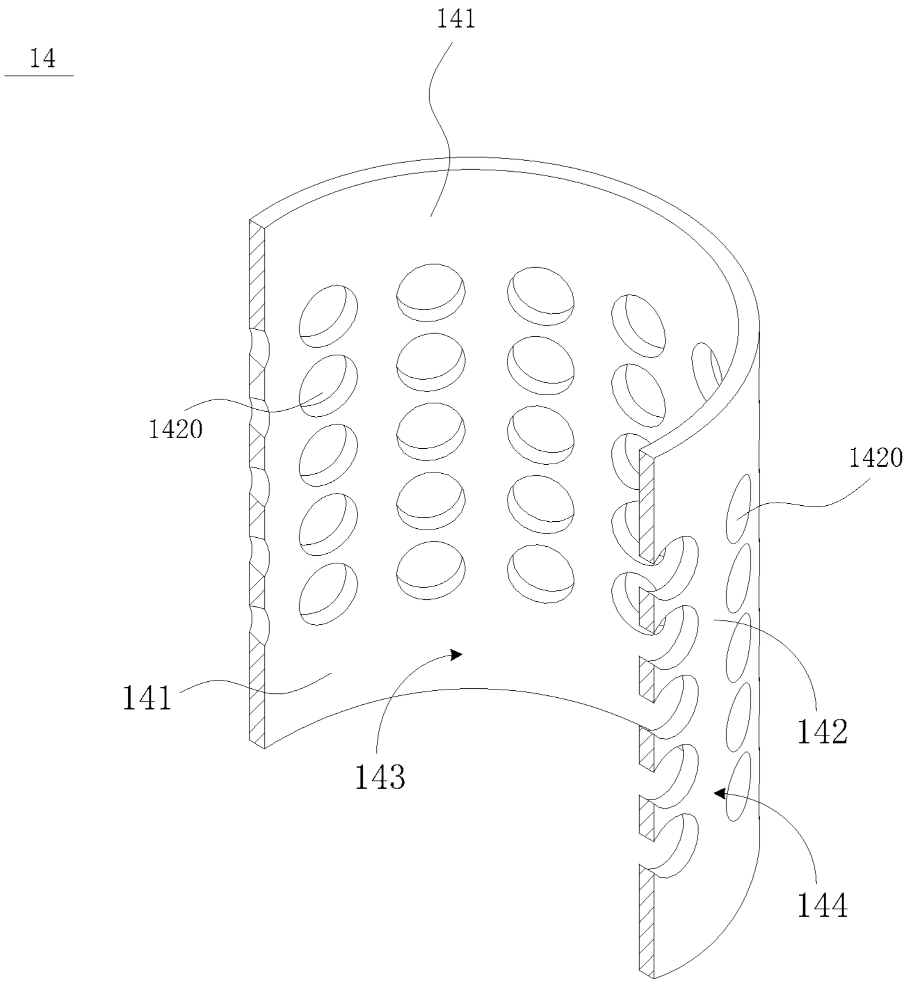
FIG. 9 is a isometric cross-sectional view of a second liquid guiding unit of an atomizing core according to second embodiment of the present application.

As illustrated in FIG. 9, the second embodiment of the present application provides a second liquid guiding unit 14. The second liquid guiding unit 14 is different from the second liquid guiding unit 12 according to the first embodiment in that no liquid storage tiny chamber 1420 is arranged at upper and lower ends of the second liquid guiding unit 14 according to the first embodiment. In this embodiment, the second liquid guiding unit 14 includes a mesh portion 142 and liquid locking portion 141 located on two opposing ends of the mesh portion 142, and the liquid storage chambers 1420 are arranged on the mesh portion 142. The liquid storage chambers 1420 may store a large amount of atomizing liquid. The atomizing liquid stored in the liquid storage chambers 1420 is retained by the liquid locking portions 141 arranged on upper and lower ends where no liquid storage chambers 1420 are disposed. That is, the liquid locking portions 141 may prevent the atomizing liquid in the liquid storage chambers 1420 from leaking from upper and lower ends of the second liquid guiding element 14.

It may be understood that, in the second embodiment, the liquid guiding element 1 may be only formed by the second liquid guiding unit 14. In this case, the heating element 2 is in direct contact with the second liquid guiding unit 14. The heating element 2, upon generating heat, heats the atomizing liquid conveyed from the second liquid guiding unit 14 to the heating element 2 to generate an aerosol for a user to directly inhale.

It may be understood that, in alternative embodiments, the liquid guiding element 1 may include the second liquid guiding unit 14, and optionally includes the first liquid guiding unit 11 and/or the third liquid guiding unit 12.

It should be noted that the specification and drawings of the present application illustrate preferred embodiments of the present application. However, the present application may be implemented in different manners, and is not limited to the embodiments described in the specification. The embodiments described are not intended to limit the present application, but are directed to rendering a thorough and comprehensive understanding of the disclosure of the present application. In addition, the above described technical feature may incorporate and combine with each other to derive various embodiments not illustrated in the above specification, and such derived embodiments shall all be deemed as falling within the scope of the disclosure contained in the specification of the present application. Further, a person skilled in the art may make improvements or variations according to the above description, and such improvements or variations shall all fall within the protection scope as defined by the claims of the present application.

In the specification of the present application, for ease of description, the liquid storage chambers and the liquid guiding micropores are both described using a circular hole as an example. The pore size of the liquid storage chambers and the liquid guiding micropores are used to specifically define the liquid storage chambers and the liquid guiding micropores. It may be understood that a cross section shape of the liquid storage chambers and the liquid guiding micropores may be a triangle, a quadrangle, a pentagon, a hexagon or other regular shapes and other irregular shapes, as long as the area of the cross section satisfies a dimension area defined by the circular hole. These shapes all fall within the protection scope of the present application.

What is claimed is:

1. An atomizing core, comprising:

a liquid guiding element and a heating element; wherein the liquid guiding element comprises a first liquid guiding unit and a second liquid guiding unit, the second liquid guiding unit comprising a first surface and a second surface that are opposed to one another, the first surface being in contact with the first liquid guiding unit, the second liquid guiding unit being provided with one or more liquid storage chambers extended through the first surface and the second surface; and the heating element is in contact with the first liquid guiding unit, configured to heat an atomizing liquid conveyed from the first liquid guiding unit to the heating element to generate an aerosol for a user to inhale;

wherein the second liquid guiding unit is fabricated from porous materials having a micropore capillarity effect.

2. The atomizing core according to claim 1, wherein the liquid storage chamber comprises a through hole penetrating the first surface and the second surface of the second liquid guiding unit.

3. The atomizing core according to claim 1, wherein the liquid storage chamber has a pore size of from 0.8 mm to 10 mm.

4. The atomizing core according to claim 1, wherein the liquid storage chamber has a pore size of from 1.1 mm to 4 mm.

5. The atomizing core according to claim 2, wherein the second liquid guiding unit is tubular in shape.

6. The atomizing core according to claim 1, wherein the first liquid guiding unit and the second liquid guiding unit are superimposed one upon another in a flat plate shape.

7. The atomizing core according to claim 1, wherein the liquid guiding element further comprises a third liquid guiding unit, the third liquid guiding unit being in contact with the second surface.

8. The atomizing core according to claim 1, wherein the second liquid guiding unit is fabricated from at least one of aramid fiber, common fiber, natural cotton, organic cotton and non-woven fabric.

9. The atomizing core according to claim 1, wherein the first liquid guiding unit comprises porous ceramics.

10. The atomizing core according to claim 1, wherein the heating element comprises a heat generating part, the heat generating part being a heat generating sheet provided with a plurality of meshes and extending along an axial direction of the first liquid guiding unit.

11. An atomizing core, comprising:

a liquid guiding element and a heating element; wherein the liquid guiding element comprises a first liquid guiding unit and a second liquid guiding unit fabricated from porous materials having a micropore capillarity effect, wherein the second liquid guiding unit comprises a first surface and a second surface, the first surface is in contact with the first liquid guiding unit, the second liquid guiding unit comprises a liquid locking portion located on opposite ends, the second liquid guiding unit is provided with one or more liquid storage chambers extended through the first surface and the second surface;

the heating element is configured to heat an atomizing liquid to generate an aerosol for a user to inhale; and the liquid storage chamber is located between two liquid locking portions which are located on opposite ends of the second liquid guiding unit in order to avoid the atomizing liquid leakage from the two ends of the second liquid guiding unit.

12. An atomizing apparatus, comprising an atomizing core, wherein the atomizing core comprises:

a liquid guiding element and a heating element; wherein the liquid guiding element comprises a first liquid guiding unit and a second liquid guiding unit, the second liquid guiding unit comprising a first surface and a second surface that are opposed to one another, the first surface being in contact with the first liquid guiding unit, the second liquid guiding unit being provided with one or more liquid storage chambers extended through the first surface and the second surface; and the heating element is in contact with the first liquid guiding unit, configured to heat an atomizing liquid conveyed from the first liquid guiding unit to the heating element to generate an aerosol for a user to inhale;

wherein the second liquid guiding unit is fabricated from porous materials having a micropore capillarity effect.

13. The atomizing apparatus according to claim 12, wherein the liquid storage chamber comprises a through hole penetrating the first surface and the second surface of the second liquid guiding unit.

14. The atomizing apparatus according to claim 13, wherein the liquid storage chamber has a pore size of from 0.8 mm to 10 mm.

15. The atomizing apparatus according to claim 14, wherein the liquid storage chamber has a pore size of from 1.1 mm to 4 mm.

16. The atomizing apparatus according to claim 12, wherein the second liquid guiding unit is tubular in shape.

17. The atomizing apparatus according to claim 12, wherein the first liquid guiding unit and the second liquid guiding unit are superimposed one upon another in a flat plate shape.

18. The atomizing apparatus according to claim 12, wherein the second liquid guiding unit is fabricated from at least one of aramid fiber, common fiber, natural cotton, organic cotton and non-woven fabric.

19. The atomizing apparatus according to claim 12, wherein the first liquid guiding unit comprises porous ceramics.

20. The atomizing apparatus according to claim 12, wherein the atomizing core further comprises a bracket provided with a liquid passing hole;

wherein the liquid guiding element is received in the bracket and the liquid storage chamber is in flow communication with the liquid passing hole.

* * * * *